United States Patent [19]

Zieringer

[11] Patent Number: 4,729,251
[45] Date of Patent: Mar. 8, 1988

[54] STEPPING MECHANISM

[75] Inventor: Josef Zieringer, Salach, Fed. Rep. of Germany

[73] Assignee: Robert Bosch GmbH, Stuttgart, Fed. Rep. of Germany

[21] Appl. No.: 33,119

[22] PCT Filed: May 14, 1986

[86] PCT No.: PCT/DE86/00203

§ 371 Date: Feb. 11, 1987

§ 102(e) Date: Feb. 11, 1987

[87] PCT Pub. No.: WO86/07424

PCT Pub. Date: Dec. 18, 1986

[30] Foreign Application Priority Data

Jun. 12, 1985 [DE] Fed. Rep. of Germany ....... 3521011

[51] Int. Cl.[4] ...................... F16H 27/02; F16H 31/00
[52] U.S. Cl. .................................. 74/129; 74/88; 74/161
[58] Field of Search ................ 74/88, 128, 129, 160, 74/161

[56] References Cited

U.S. PATENT DOCUMENTS

| 277,849 | 5/1883 | Park | 74/88 |
|---|---|---|---|
| 388,390 | 8/1888 | Barton | 74/129 |
| 596,291 | 12/1897 | Thornton | 74/161 |
| 2,594,828 | 4/1952 | Tripp | . |
| 3,161,070 | 12/1964 | Venables | 74/129 |
| 3,388,605 | 6/1968 | Schafer | 74/88 |
| 3,648,530 | 3/1972 | Eckerdt | 74/128 |
| 3,762,228 | 10/1973 | Crepin | 74/128 |
| 3,924,527 | 12/1975 | Shenoha et al. | 74/129 |
| 3,969,945 | 7/1976 | Englund | 74/128 |
| 3,977,263 | 8/1976 | Nara | 74/129 |

FOREIGN PATENT DOCUMENTS

| 1326123 | 3/1963 | France | . |
|---|---|---|---|
| 55-139549 | 10/1980 | Japan | 74/129 |
| 634053 | 11/1978 | U.S.S.R. | 74/129 |

Primary Examiner—Lawrence Staab
Attorney, Agent, or Firm—Michael J. Striker

[57] ABSTRACT

A stepping mechanism comprises a toothed wheel and a shifting member which shifts toothed wheel by a tooth pitch. The movement plane of the shifting member extends at a right angle to that of the toothed wheel. A two-armed shifting pawl which is supported on a reciprocating slide so as to be swivelable and has a tooth guiding surface, serves as the shifting member and is inclined with respect to the movement direction of the slide and is switched over to the opposite inclination after every shifting cycle.

8 Claims, 3 Drawing Figures

STEPPING MECHANISM

BACKGROUND OF THE INVENTION

The present invention relates to a stepping mechanism. Such stepping mechanisms serve to rotate a toothed wheel in a stepwise manner; a machine element, for example, a parts magazine or the like, which is to be positioned, is in a drive connection with the shaft of the toothed wheel by way of a gear unit. The publication of "Constructional Elements of Precision Mechanics", Richter and Voss, 1959, page 477, discloses stepping mechanisms comprising two wheels whose axes intersect. The driving wheel carries two parallel ribs at its outer surface area, which are connected by means of an inclined intermediate piece. These ribs engage in corresponding gaps of the driven toothed wheel. During the rotation of the driving wheel, the toothed wheel is only shifted further when the inclined intermediate piece is engaged. The shifting distance corresponds to the distance between two parallel ribs. After shifting, the toothed wheel is locked again. Such stepping mechanisms are used predominantly in motion picture technology for shifting the film strip by one frame in each instance. They require a relatively narrow tooth pitch, which sharply restricts their range of application.

In addition, there are single-tooth gear units, of which the Geneva movement star wheels are the most well-known. In this case, the driving wheel carries a peg, instead of a tooth, while the driven wheel, the so-called star wheel, comprises four slots. In order to secure the catch position the driving wheel is provided with a cylindrical projection which engages in a recess of the star wheel in each catch position. Such gear units require very accurate manufacturing. The wheels consist, as a rule, of precision-cut parts whose surfaces, which contact one another, are subjected to fine machining in order to reduce the friction.

Finally, tooth ratchet mechanisms are known, in which the stepwise shifting of a toothed wheel is effected by means of an oscillating member which engages in the teeth of the toothed wheel with a pawl. Since the toothed wheel is not secured when the member swings back, a special stop pawl must be applied which engages in corresponding tooth gaps of the toothed wheel. Whereas in ratchet mechanisms with a shifting pawl and a stop pawl the oscillating shifting member carries along and accordingly shifts the toothed wheel by means of the shifting pawl during forward movement, but, during reverse movement, runs idle and while the toothed wheel is at rest, the toothed wheel is shifted further in both oscillating directions of the shifting member in ratchet mechanisms with two pawls. A shifting pawl shifts in each instance, while the other runs idle.

SUMMARY OF THE INVENTION

It is an object of the present invention to provide a stepping mechanism, which would require only a shifting pawl in order to shift the toothed wheel further by one tooth pitch in each instance in both movement directions of the slide. The stepping mechanism according to the invention has a simple, sturdy construction which requires no fine-machined precision structural component parts and is uncritical with respect to tolerances. Another advantage of the invention resides in that the stepping mechanism is easily adaptable to toothed wheels with different tooth pitches by means of a corresponding inclination and/or length of the tooth guiding face of the shifting pawl.

In accordance with further modifications of the invention it is particularly advantageous for the presetting of the pawl position that the slide have two stops which define the swiveling path of the shifting pawl and determine the angle of inclination of the tooth guiding surface and which are arranged in the movement path of a lever arm, which is connected with the shifting pawl so as to be fixed with respect to rotation relative to it. The conveyance of the shifting pawl into its two working positions can be achieved in a simple manner in that two stops, which are integral with the device, are provided in the movement path of another lever arm of the shifting pawl for switching the shifting pawl over to the opposite inclination of its tooth guiding surface. In order to secure the toothed wheel in its respective rotational position after shifting forward it is advisable that the slide carrying the shifting pawl would have two slots for receiving that tooth of the toothed wheel following the tooth engaged by the tooth guiding surface of the shifting pawl, which slots extend in the movement direction of the slide, are symmetrical in the manner of a mirror image and are open on one side.

DETAILED DESCRIPTION OF THE PREFERRED EMBODIMENT

Figure 1:
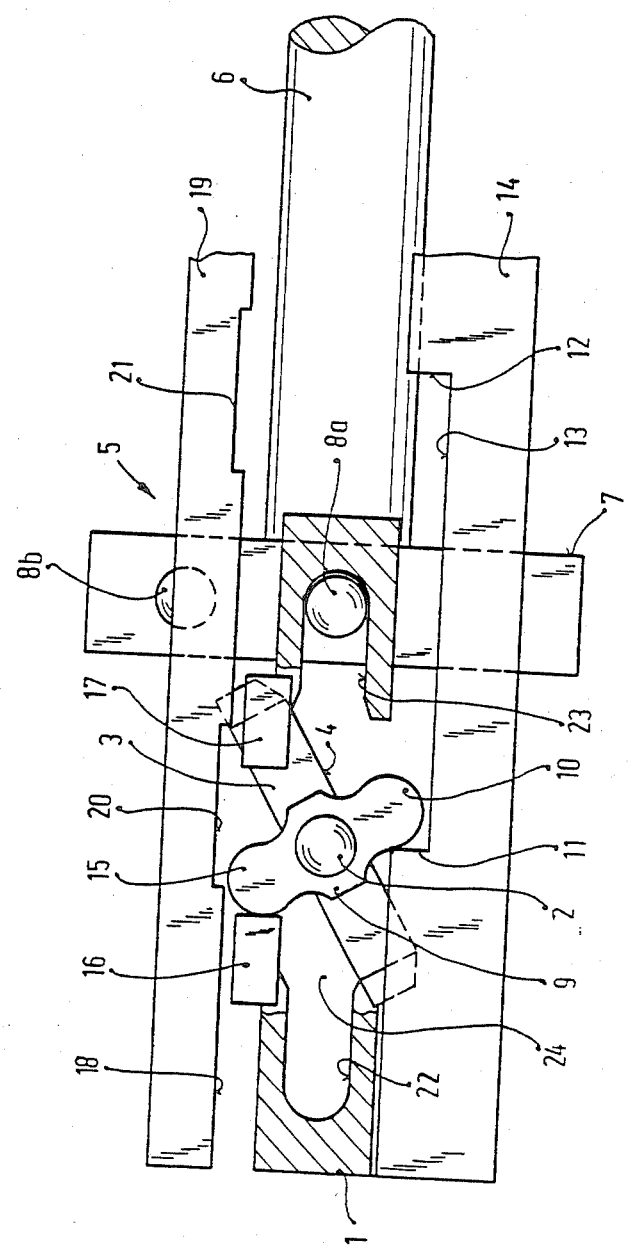
FIG. 1 shows a simplified view of the stepping mechanism, partially in section, with its slide located in an end position.
Figure 2:
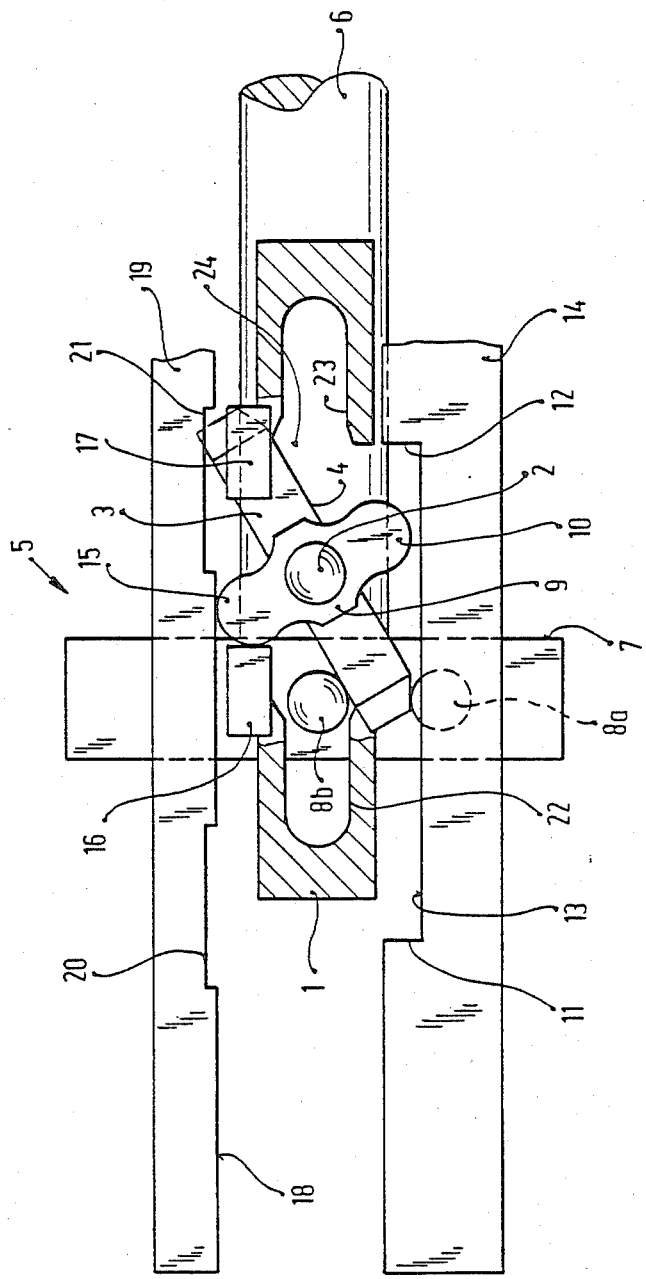
FIG. 2 shows the stepping mechanism during the execution of s shifting step.
Figure 3:
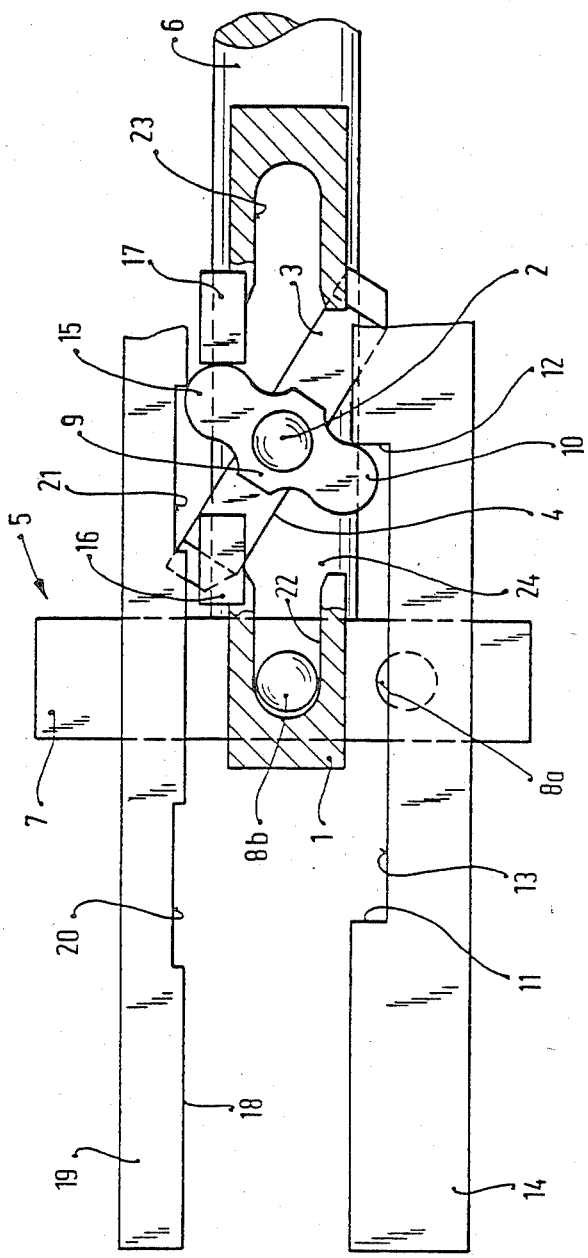
FIG. 3 shows the arrangement after the conclusion of the shifting step, wherein the slide occupies its other end position.

In the FIGS. 1 through 3, a slide, which consists of a metal block, is designated by reference numeral 1 and can be reciprocated between the end positions shown in FIGS. 1 and 3. The slide 1 has a bearing pin 2 at its underside for a two-armed shifting pawl 3, whose edge, which serves as a tooth guiding surface 4, cooperates with a toothed wheel 5 which is fastened at a shaft 6. The movement planes of the slide 1 and the toothed wheel 5 are extend at right angles with respect to one another. The toothed wheel is constructed in the exemplified embodiment as a pin wheel in which a plurality, e.g. twelve, pins are arranged at identical angular distances from one another at the circumference of a cylindrical base body 7. Only two successive pins 8a and 8b are shown in the figures for the sake of simplicity. The tooth guiding surface 4 of the shifting pawl 3 is inclined with reference to the movement direction of the slide 1. The inclination and/or the length of the tooth guiding surface 4 depends on the tooth pitch. The larger this is, i.e. the less pins 8 the toothed wheel 5 comprises, the greater is the angle of inclination of the tooth guiding surface 4, assuming its length remains constant.

As shown by a comparison of FIGS. 1 and 3, the shifting pawl 3 switches over into the opposite inclination after every shifting cycle. In addition, a two-armed lever 9 sits on the bearing pin 2 of the shifting pawl 3 and is connected with the latter so as to be fixed with respect to rotation relative to it. Two stops 11 and 12, which are integral with the apparatus and are formed as edges of a cut out portion 13 on a rail 14, are located in the movement path of the lever arm 10. This rail can serve as a guide rail and holding-down device for the slide 1.

The other lever arm 15 of the lever 9, which is arranged at a right angle relative to the shifting pawl 3, cooperates with two stop blocks 16, 17 of the slide 1, which define the swiveling path of the shifting pawl 3 and determine the inclination angle of the tooth guiding surface 4. In order that the shifting pawl 3 does not yield to the pressure exerted on the tooth guiding surface 4 by the pin 8a or 8b during the forward shifting of the toothed wheel 5, the lever arm 15 is supported on the edge 18 of a rail 19 during the shifting cycles, the rail 19 being integral with the apparatus. The rail 19 has two cut out portions 20, 21 in the area of the edge which provide the necessary free space for the swiveling of the lever 9 at the end of the shifting cycles.

In order to secure the toothed wheel 5 in its rotational position after shifting forward, the slide 1 comprises two slots 22, 23 on its underside, which are open at one side and are adapted to the diameter of the pins 8a, 8b and lie opposite one another in the movement direction of the slide 1 so as to be separated from one another by means of an opening 24 for receiving the shifting pawl 3 and the lever 9. The slot 22 or 23 receives the pin of the toothed wheel 5 which follows the pin engaged by the tooth guiding surface 4 of the shifting pawl 3.

The stepping mechanism of the invention operates as follows: Proceeding from the initial position shown in FIG. 1, the slide 1 is moved by one tooth pitch to the right in order to advance the toothed wheel 5. In so doing, the tooth guiding surface 4 of the shifting pawl 3 comes in contact with the pin 8a after the slot 23 of the slide 1 has released it. The tooth guiding surface 4 pushes back the pin 8a and accordingly causes a rotation of the toothed wheel 5. The width of the shifting pawl 3 is selected so that it fits into the space between two adjoining pins of the toothed wheel 5. FIG. 2 shows a phase of the shifting cycle in which the tooth guiding surface 4 just leaves the pin 8a which has been shifted further, and the following pin 8b is located opposite the slot 22 of the slide 1. As can also be seen from this figure, the arm 15 of the lever 9 is supported at the edge 18 of the rail 19 and accordingly prevents an unwanted swiveling of the shifting pawl 3 by means of the pin 8a contacting the tooth guiding surface 4.

If the movement of the slide 1 is continued to the right, the arm 10 of the lever 9 strikes against the stop edge 12, which is integral with the apparatus, after the slot 22 has enclosed the pin 8b and secured the toothed wheel 5 in its shifting position. The stop edge 12 ensures that in the final phase of the slide movement the shifting pawl 3 changes over into the inclined position shown in FIG. 3 which is predetermined by means of the stop block 17. The swiveling of the shifting pawl 3 is made possible by means of the cut out portion 21 in the rail 19.

If the slide 1 is now moved to the left the tooth guiding surface 4 of the shifting pawl 3 engages the pin 8b previously located in the slot 22 and rotates the wheel 5 in the same direction as before by a additional tooth pitch. The following pin, not shown, is embraced at the end of the shifting movement by the slot 23 of the slide 1, which stops the toothed wheel 5 until the next shifting process.

Only one drive element, for example, a pneumatic or hydraulic drive with a cylinder, is required for moving the slide 1, so that the expenditure on control means can be considerably reduced.

It will be understood that each of the elements described above, or two or more together, may also find a useful application in other types of stepping mechanisms differing from the types described above.

While the invention has been illustrated and described as embodied in a stepping mechanism, it is not intended to be limited to the details shown, since various modifications and stuctural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essnetial characteristics of the generic or specific aspects of this invention.

What is claimed as new and desired to be protected by Letters Patent is set forth in the appended claims:

1. Stepping mechanism comprising a toothed wheel and a shifting member which engages a tooth of said wheel and shifts the toothed wheel by a tooth pitch in each shifting cycle, said shifting member being movable in a movement plane which extends at a right angle to that of said toothed wheel; and a reciprocating slide, said shifting member being formed by a two-armed shifting pawl (3) which is swivelably supported on said reciprocating slide (1) and has a tooth guiding surface (4) which is inclined with respect to a movement direction of said slide, said pawl being switchable over to opposite inclination after each shifting cycle, at least a length and an angle of inclination of said pawl being adapted to the tooth pitch of said toothed wheel (5).

2. Stepping mechanism according to claim 1, wherein said slide (1) has two stops (16, 17) which define the swiveling path of said shifting pawl (3) and determine the angle of inclination of said tooth guiding surface (4); and further including a lever arm (15) which is connected with said shifting pawl so as to be fixed with respect to rotation relative to the same, said stops being arranged in a movement path of said lever arm.

3. Stepping mechanism according to claim 1, and further including a further lever arm (10) connected to said shifting pawl and two stops (11, 12), which are integral with the mechanism and are provided in a movement path of said further lever arm (10) for switching said shifting pawl to the opposite inclination of said tooth guiding surface (4).

4. Stepping mechanism according to claim 2, wherein said lever arm (15), which cooperate with said stops (16,17), respectively is positioned at a right angle to said shifting pawl (3) and is connected with the latter so as to be fixed with respect to rotation relative to it.

5. Stepping mechanism according to claim 4, further including a guide rail (19), which is integral with the mechanism and secures said shifting pawl (3) in an inclined position thereof during each shifting cycle, said lever arm (15) cooperating with said rail.

6. Stepping mechanism according to claim 5, wherein said slide (1) has two slots (22, 23) for receiving that tooth (8a or 8b) of said toothed wheel (5) which follows the tooth engaged by said tooth guiding surface (4) of said shifting pawl in each cycle, said slots (22, 23) extending in the movement direction of said slide and being symmetrical mirror-inverted with each other and open at one side.

7. Stepping mechanism according to claim 6, wherein said shifting pawl (3) is arranged in an opening (24) provided between said two slots (22, 23) of said slide (1).

8. Stepping mechanism according to claim 2, and further including a further lever arm (10) connected to said shifting pawl and further two stops (11, 12), which are integral with the mechanism and are provided in a movement path of said further lever arm (10) for switching said shifting pawl to the opposite inclination of said tooth guiding surface (4).

* * * * *